United States Patent [19]
Moriyama et al.

[11] 3,943,299
[45] Mar. 9, 1976

[54] LINK NETWORK

[75] Inventors: Hiromi Moriyama, Fujisawa; Motosuke Kuwabara, Yokohama; Tadao Tsuruda, Yokohama; Tatuo Hamada, Yokohama, all of Japan

[73] Assignee: Hitachi, Ltd., Japan

[22] Filed: July 22, 1974

[21] Appl. No.: 490,269

[30] Foreign Application Priority Data
July 25, 1973    Japan.............................. 48-83136

[52] U.S. Cl............................. 179/18 AG; 179/98
[51] Int. Cl.² ........................................ H04Q 3/06
[58] Field of Search.. 179/18 AG, 98, 18 G, 18 AH, 179/18 C, 18 FC, 18 A, 18 AD, 27 CA

[56] References Cited
UNITED STATES PATENTS
3,513,263    5/1970    Bastian et al................... 179/27 CA
3,626,103    12/1971    Mina et al...................... 179/18 AG Primary Examiner—Thomas A. Robinson
Attorney, Agent, or Firm—Craig & Antonelli

[57] ABSTRACT

A link network comprises a plurality of sublink networks having the same structure and an external link cable interconnecting the plural sublink networks. Each sublink network consists of lattice switches arranged in two stages and internal links interconnecting the lattice switches in the opposite stages. The external link cable connects those link terminals of the lattice switches of each sublink network which are not connected with the internal links with like link terminals of another sublink network.

11 Claims, 4 Drawing Figures

LINK NETWORK

The present invention relates to a link network in an automatic telephone exchange and more particularly to a link network constituted of a plurality of switch groups each serving as mounting unit.

A link network usually comprises lattice switches arranged in at least two stages and links connecting the switches in the stages. As a lattice switch is known a matrix of reed or ferreed switches, an electro-magnetic-mechanical switch such as a crossbar switch or an electronic switch such as a matrix of semiconductor switching elements. The links between the adjacent stages are wired according to a predetermined rule, so as to connect all the lattice switches of one stage with all the lattice switches of the other stage and to facilitate the control of the operation of the link network. A two-stage-switch link network which is fundamental to all the link networks is taken as an example. A conventional two-stage-switch link network is obtained by mounting stages of lattice switches on a framework as mounting unit and by connecting the lattice switches of the stages by an interstage link cable which is previously bundled, according to a predetermined rule. In the conventional link network, the number of conductors contained in the bundles of the interstage link cable is usually very great and the wiring work is also very difficult. The plug-in system in which the lattice switches and the interstage link cables are connected with each other by means of connectors, has already been attempted. However, in this case also, the conductors of the link cable must be terminated by connectors so that much labor is needed when the connection between the conductors and the connectors is performed. The amount of the complicated, tiresome labor required in wiring increases abruptly with the increase in the number of the lattice switches used in each stage. Moreover, the conventional two-stage-switch link network itself forms a mounting unit and when the number of the lattice switches is large, the mounting unit also becomes large so that some nuisances are incurred in fabrication and maintenance.

It is therefore one object of the present invention to provide a link network having a high producibility.

Another object of the present invention is to provide a link network the maintenance of which is very easy.

According to the present invention, there is provided a link network comprising: a plurality of sublink networks each of which includes a plurality of lattice switches arranged in at least two stages, each lattice switch having a plurality of link terminals, and internal links connecting a part of the link terminals of the lattice switches in one of the stages with a part of the link terminals of the lattice switches in an adjacent stage; and an external link cable connecting those link terminals of the lattice switches in one stage which are not connected with the internal links with those link terminals of the lattice switches in adjacent stages of other sublink networks which are not connected with internal links.

According to the preferred embodiments of the present invention, each sublink network is provided with connector sockets connected with those link terminals of the lattice switches in the sublink network which are not connected with the internal link and it is formed together with the associate lattice switches and internal links into a mounting module and the external links forms a cable which is terminated at both ends by connector plugs which can be plugged in the connector sockets.

As described above, according to the present invention, the link network is formed of plural sublink networks having the same structure and an external link cable so that only one kind of sublink network and an external link cable whose capacity is reduced by that of internal links have to be fabricated. Accordingly, the producibility is considerably improved and also the maintenance is easy since each sublink network can be accessed for maintenance. These advantages can be further increased by performing the connection of the external link through connectors as seen in the embodiments.

The above and other objects, features and advantages of the present invention will be more apparent from the following comparative description of the prior art and the preferred embodiments of the invention, taken in conjunction with the accompanying drawings, in which.

Figure 1:
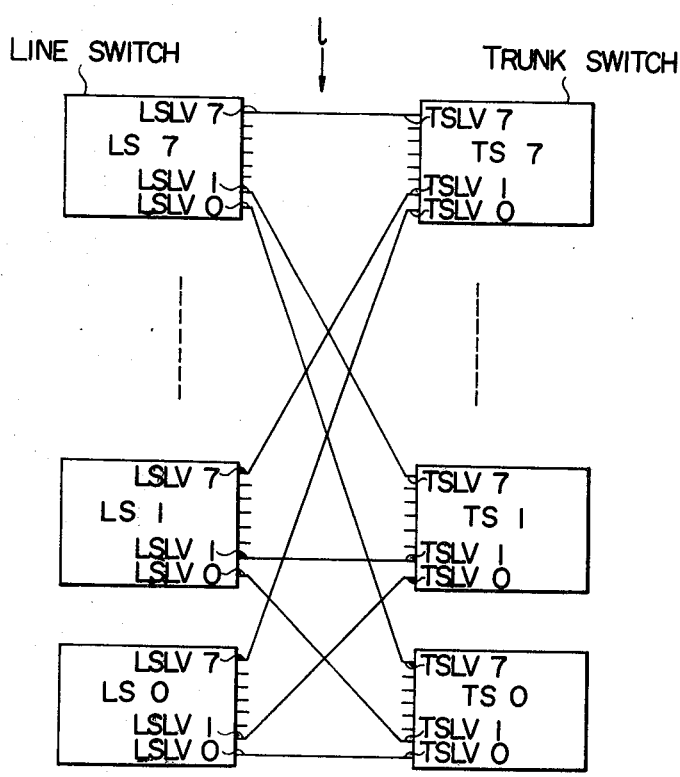
FIG. 1 shows a link wiring diagram of a conventional two-stage-switch line network.

FIG. 1 shows a typical example of conventional two-stage-switch link networks. Each of eight lattice switches LS0 – LS7 in the first stage is referred to as line switch and it has eight link terminals LSLV0 – LSLV7. Each of eight lattice switches TS0 – TS7 in the second stage is referred to as trunk switch and it has eight link terminals TSLV0 – TSLV7. The link terminals of the line switches LS0 – LS7 are connected with those of the trunk switches TS0 – TS7 through links l. In order to uniformly distribute traffic to the respective switches and to facilitate the control, as described above, the wiring of the links l is made on the basis of such a rule that the $n$-th link terminal LSLVn of the $m$-th line switch LSm is connected with the $m$-th link terminal TSLVm of the $n$-th trunk switch TSn. In this way of link wiring, the link terminals LSLV0's of the line switches LS0 – LS7 are connected respectively with the link terminals TSLV0 – TSLV7 of the trunk switch TS0, the link terminals LSV1's of the link switches LS0 – LS7 are connected respectively with the link terminals TSLV0 – TSLV7 of the trunk switch TS1 and so on. Accordingly, the whole link forms a pattern. Therefore, even if the link network shown in FIG. 1 is constituted of four sublink networks each of which comprises two line switches, two trunk switches and internal links connecting the line switches with the trunk switches, the wiring patterns of the internal links of the respective sublink networks are different from one another, that is, four different kinds of sublink networks are needed.

Figure 2:
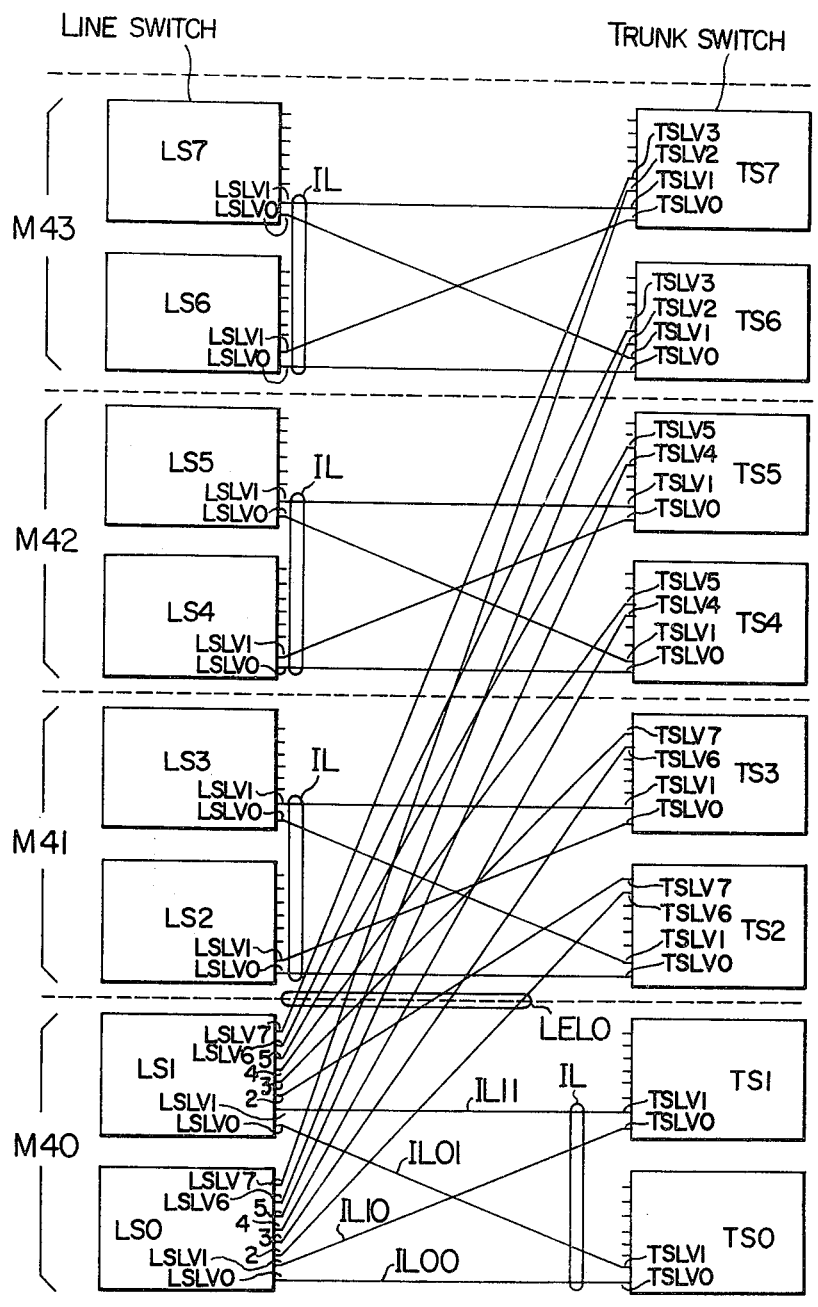
FIG. 2 shows a link wiring diagram of a two-stage-switch link network as an embodiment of the present invention.

FIG. 2 shows an example of the link wiring of a two-stage-switch link network as one embodiment of the present invention. The two-stage-switch link network consists of four sublink networks M40 – M43 and an external link cable (in this figure only one L-side cable of the external link cable LEL0 between the line switches LS0 and LS1 of the sublink network M40 and the trunk switches TS2 – TS7 of the sublink networks MM41 – M43 is shown for clearness' sake) connecting one sublink network with another.

The line switches and the trunk switches in the sublink networks M40 – M43 are differently labeled for facilitating identification, but the structures of the sublink networks are all the same. Therefore, description will be made only of the sublink network M40. The sublink network M40 consists of two line switches LS0 and LS1, two trunk switches TS0 and TS1 and internal links IL between the trunk and the line switches. The internal links IL consists of four links IL00, IL10, IL01 and IL11 respectively connecting the link terminal LSLV0 of the line switch LS0 with the link terminal TSLV0 of the trunk switch TS0, the link terminal LSLV1 of the switch LS0 with the link terminal TSLV0 of the trunk switch TS0, the link terminal LSLV0 of the line switch LS1 with the link terminal TSLV1 of the trunk switch TS1, and the link terminal LSLV1 of the line switch LS1 with the link terminal TSLV1 of the trunk switch TS1. The above description of the sublink network M40 will be similarly applicable to the sublink networks M41 – M43 if the line switches LS2, LS4 and LS6 are substituted for the line switch LS0, the line switches LS3, LS5 and LS7 for the line switch LS1, the trunk switches TS2, TS4 and TS6 for the trunk switch TS0, and the trunk switches TS3, TS5 and TS7 for the trunk switch TS1, respectively.

It should here be noted that the sublink networks M40 – M43, each having switches and internal links, are of the same structure, as seen in FIG. 2.

Now, the general rule of the wiring of all the links, i.e. internal and external links, will be described. The rule of the wiring in FIG. 2 is as follows.

1. The n-th link terminal LSLVn of an even-numbered line switch LS2m is connected with the $(8 - n)$-th link terminal $TSLV_{8-n}$ (when $n$ is even) or the $(9 - n)$-th link terminal $TSLV_{9-n}$ (when $n$ is odd) of the $(2m + n)$-th trunk switch $TS_{2m+n}$.

2. The $n$-th link terminal LSLVn of an odd-numbered line switch $LS_{2m+1}$ is connected with the $(9 - n)$-th link terminal $TSLV_{9-n}$ (when $n$ is even) or the $(10 - n)$-th link terminal $TSLV_{10-n}$ (when $n$ is odd of the $(2m + n)$-th trunk switch $TS_{2m+n}$. Here, in the items (1) and (2) of the above rule, $m = 0, 1, 2$ and $3$, and $8 - n, 9 - n, 10 - n$ and $2m + n$ are expressed in moduluo 8.

Figure 3:
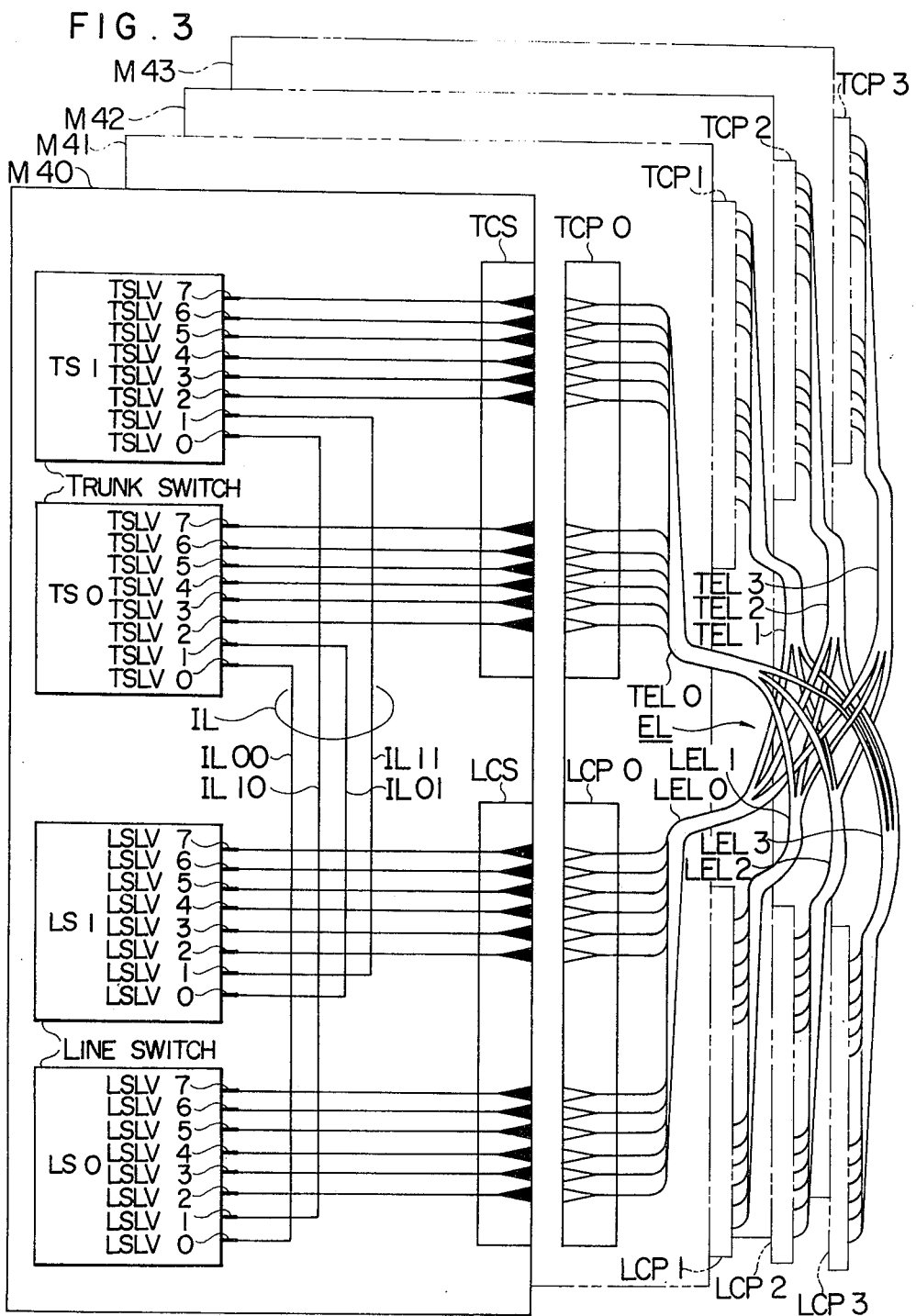
FIG. 3 shows the more concrete construction diagram of the two-stage-switch link network shown in FIG. 2.

FIG. 2 illustrates especially the link structure of an embodiment of the present invention and further the details of the structure of the embodiment is shown in FIG. 3.

In FIG. 3, only the sublink network M40 is concretely shown since the sublink networks M40 – M43 are of the same structure. In the sublink network M40, the trunk switches TS0 and TS1 are disposed, for the facility of mounting, above the line switches LS0 and LS1. The link terminals LSLV0 and LSLV1 of the line switches LS0 and LS1 are connected with the link terminals TSLV0 and TSLV1 of the trunk switches TS0 and TS1 through the internal links IL (IL00, IL10, IL01 and IL11). The remaining link terminals LSV2 – LSLV7 and TSLV2 – TSLV7 of the line switches LS0 - LS1 and the trunk switches TS0 – TS1 are connected respectively with the corresponding terminals of an L-side connector socket LCS and a T-side connector socket TCS. The sublink network M40 is constructed by attaching the line switches LS0 and LS1, the trunk switches TS0 and TS1, the internal links IL, the L-side connector socket LCS and the T-side connector socket TCS onto a frame not shown in the form of a mounting module. The structures of the other sublink networks M41 – M43 are the same as that of the sublink network M40.

The external links form a cross-connecting cable EL terminated by connector plugs LCP0 – LCP3 and TCP0 – TCP3 at both ends. L-side cable LEL0 connected with the twelve terminals of the L-side connector plug LCP0 is divided into three branches and the branches are then connected with the corresponding terminals of the T-side connector plugs TCP1 – TCP3 according to the above described rule of wiring of the external links. On the other hand, T-side cable TEL0 connected with the twelve terminals of the T-side connector plug TCP0 is split and similarly connected with the L-side connectors LCP1 – LCP3.

The L-side connector plugs LCPO – LCP3 are plugged in the L-side connector sockets LCS's of the sublink networks M40 – M43 and the T-side connector plugs TCPO – TCP3 are plugged in the T-side connector sockets TCS's of the sublink network M40 – M43. Through this plug-in connection is completed a link network having such a link structure as shown in FIG. 2.

In FIG. 3, it should be noted that all the sublink networks M40 – M41 have the same structure and that the number (6) of the terminals required in the L- or T-side connector socket can be smaller than the number (8) of the link terminals of the line or trunk switch by the number (2) of the link terminals connected with the internal links. From the above features, there can be obtained two merits. One of them is that only one kind of sublink network is needed and according to the other merit the size of the external link cable EL can be reduced so that the fabrication thereof can be facilitated.

Figure 4:
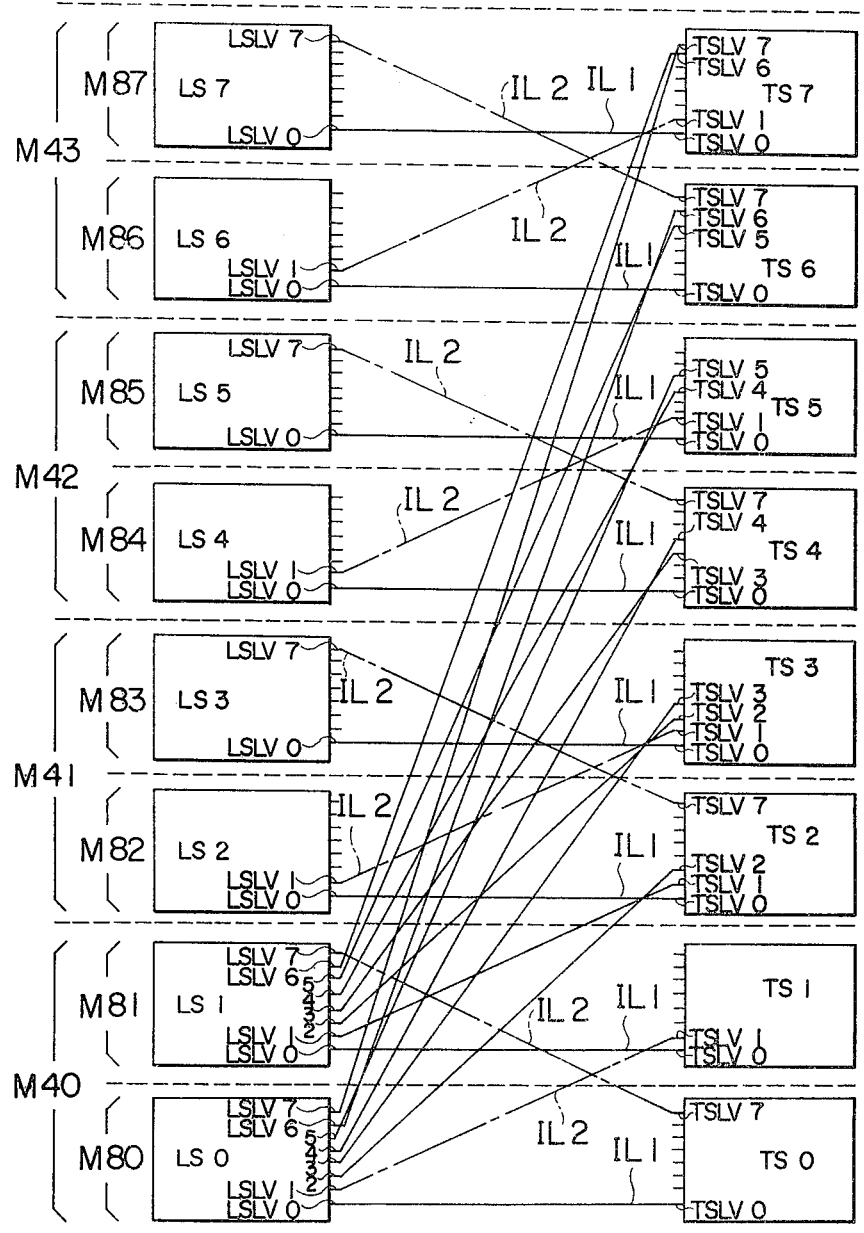
FIG. 4 shows a link wiring diagram of a two-stage-switch link network as another embodiment of the present invention.

FIG. 4 shows a link network as another embodiment of the present invention. This embodiment is also a two-stage-switch link network consisting of eight line switches SL0 – LS7, eight trunk switches TS0 – TS7 and links between the line and trunk switches. This link network may also be constituted of four sublink networks M40 – M43 or of eight sublink networks M80 – M87. In case where the link network is constituted of four sublink networks M40 – M43, internal links in each sublink network consist of four links i.e. two IL1's and two IL2's. On the other hand, if the link network is formed of eight sublink networks M80 – M87, only the links IL1's can be used as internal links but the links IL2's are treated as a part of the external links.

The general rule of the wiring of the link shown in FIG. 4 is as follows. The $n$-th link terminal LSLVn of the $m$-th line switch LSm is connected with the $n$-th link terminal TSLVn of the $(m + n)$-th trunk switch $TS_{m+n}$. Here, $m + n$ is expressed in modulo 8.

In the foregoing lines and in the figures, the link terminal of each lattice switch and each link are described and shown as if they are formed respectively of a single terminal and a single lead, for the sake of simplifying the description and the drawings. As well known, in fact, each link usually consists of at least two leads, and therefore, each link terminal at least two terminals, but it should be understood that the above simplification has no influence upon the previous description and the scope of the present invention.

What we claim is:

1. A link network comprising a. a plurality of sublink networks having the same structure each of which includes a plurality of lattice switches arranged in at least two stages, each lattice switch having a plurality of link terminals, and internal links connecting a part of the link terminals of the lattice switches in one of the stages with a part of the link terminals of the lattice switches in an adjacent stage of the same one of said plurality of sublink networks; and b. an external link cable connecting those link terminals of the lattice switches in the one stage which are not connected with the internal links with those link terminals of the lattice switches in adjacent stages of each other sublink network of said plurality of sublink networks which are not connected with the internal links.

2. A link network as claimed in claim 1, wherein each sublink network is constructed in the form of a mounting module.

3. A link network comprising a. a plurality of sublink networks having the same structure each of which includes a plurality of lattice switches arranged in at least two stages, each lattice switch having a plurality of link terminals, internal links connecting a part of the link terminals of the lattice switches in one of the stages with a part of the link terminals of the lattice switches in an adjacent stage of the same sublink network, and first connector means connected with those link terminals of the lattice switches which are not connected with the internal links;

b. external link cables connected at their ends with second connector means engageable with the first connector means of the sublink networks for interconnecting the respective stages of each different sublink network.

4. A link network as claimed in claim 3, wherein each sublink network is constructed in the form of a mounting module.

5. A link network as claimed in claim 3, wherein the first and second connector means are provided corresponding to the stages of the lattice switches.

6. A link network comprising:

a plurality of sublink networks, each of said sublink networks including at least first and second stages, each of said first and second stages including at least one lattice switch, each of said lattice switches having a plurality of terminals;

internal link means for interconnecting within each sublink network a first portion of said terminals of said lattice switches in said first stage with a respective first portion of said terminals of said lattice switches in said second stage; and external link means for interconnecting each of said plurality of sublink networks, said external link means connecting at least a second portion of said terminals of said lattice switches in said first stage of one sublink network with at least a second portion of said terminals of said lattice switches of said second stages of each other sublink network, wherein each sublink network has the same structure.

7. A link network according to claim 6, wherein each sublink network is constructed in the form of a mounting module including the respective lattice switches of each of said first and second stages, said internal link means, and connector means of said external link means for effecting interconnection of said plurality of sublink networks.

8. A link network according to claim 6, wherein each sublink network includes at least two lattice switches for each of said first and second stages.

9. A link network according to claim 6, wherein each sublink network includes one lattice switch for each of said first and second stages.

10. A link network according to claim 6, wherein each first stage of each sublink network includes at least one lattice line switch for a telephonic system, and each second stage of each sublink network includes at least one lattice trunk switch for said telephonic system.

11. A link network according to claim 6, wherein said first portion of said terminals of each lattice switch of the first and second stages are selected to provide an identical connection by said internal link means for each of said plurality of sublink networks.

* * * * *